United States Patent
Burke

(10) Patent No.: US 7,054,039 B2
(45) Date of Patent: May 30, 2006

(54) FAX CONFIRMATION DEVICE

(76) Inventor: James Burke, 14 North St., Old Bridge, NJ (US) 08857

( * ) Notice: Subject to any disclaimer, the term of this patent is extended or adjusted under 35 U.S.C. 154(b) by 866 days.

(21) Appl. No.: 10/002,005

(22) Filed: Dec. 5, 2001

(65) Prior Publication Data

US 2003/0025944 A1  Feb. 6, 2003

Related U.S. Application Data

(60) Provisional application No. 60/308,613, filed on Jul. 31, 2001.

(51) Int. Cl.
*H04N 1/00* (2006.01)

(52) U.S. Cl. .................. 358/405; 358/3.28; 358/488; 358/468; 705/75

(58) Field of Classification Search ............ 358/405, 358/3.28, 1.9, 470, 498, 426.12, 1.14, 488, 358/468; 705/75; 347/179, 197; 380/246, 380/51; 399/184; 382/112; 713/168
See application file for complete search history.

(56) References Cited

U.S. PATENT DOCUMENTS

| | | | | |
|---|---|---|---|---|
| 4,300,169 A | * | 11/1981 | Sato ........................... 358/488 |
| 4,301,479 A | * | 11/1981 | Fukinuki et al. ....... 358/426.12 |
| 4,504,084 A |   | 3/1985  | Jauch |
| 4,511,902 A | * | 4/1985  | Nagashima ................. 347/179 |
| 4,590,486 A | * | 5/1986  | Yana .......................... 347/197 |
| 4,777,510 A | * | 10/1988 | Russel ........................ 399/184 |
| 5,212,558 A |   | 5/1993  | Obata et al. |
| 5,465,167 A | * | 11/1995 | Cooper et al. .............. 358/468 |
| 5,497,250 A | * | 3/1996  | Kawashima ................ 358/498 |
| 5,625,467 A | * | 4/1997  | Kurokawa ................... 358/470 |
| 5,764,371 A | * | 6/1998  | Kawashima et al. ........ 358/405 |
| 5,818,606 A | * | 10/1998 | Muramatsu et al. ........ 358/405 |
| 5,837,042 A |   | 11/1998 | Lent et al. |
| 5,867,586 A | * | 2/1999  | Liang ......................... 382/112 |
| 5,923,763 A | * | 7/1999  | Walker et al. ................ 380/51 |
| 6,188,766 B1 | * | 2/2001 | Kocher ....................... 380/246 |
| 6,522,426 B1 | * | 2/2003 | Park ........................... 358/1.9 |
| 6,628,412 B1 | * | 9/2003 | Jeran et al. ................ 358/1.14 |
| 2002/0087861 A1 | * | 7/2002 | Segev et al. ................ 713/168 |

FOREIGN PATENT DOCUMENTS

GB  2342434 A  * 12/2000

* cited by examiner

*Primary Examiner*—Kimberly Williams
*Assistant Examiner*—Beniyam Menberu
(74) *Attorney, Agent, or Firm*—Richard C. Litman

(57) ABSTRACT

A method and apparatus for placing an indelible mark on each page of a document which has been sent by FAX. The sender's FAX machine applies a clear/transparent chemical or ink message on the surface of the document which contains information such as the FAX machine identification number, telephone number of the FAX recipient, and the time and date of the FAX transmission. The information is printed and is invisible to the naked eye, but becomes visible underneath a low voltage UV light. The light is placed above the tray in which completed faxes are temporarily stored to make the mark visible to the operator to assure that each page of the document was separately sent. A separate pen light allows a sender or management person to confirm that a document has been properly and completely transmitted. Visible ink may be used if desired.

12 Claims, 8 Drawing Sheets

FAX CONFIRMATION DEVICE

CROSS-REFERENCE TO RELATED APPLICATION

This application claims the benefit of U.S. Provisional Patent Application Ser. No. 60/308,613, filed Jul. 31, 2001.

BACKGROUND OF THE INVENTION

1. Field of the Invention

The present invention relates to a method and apparatus to employ a marking system to documents which is either visible to the naked eye under normal illumination, or invisible to the naked eye under normal illumination but readable under a specified illumination source, and, more particularly, a marking system to confirm that a document has been completely sent by facsimile(FAX) machine to a particular receiver at a particular time and date.

2. Description of Related Art

In the use of Facsimile(FAX) machines, it has been a problem within an office environment to confirm that a document has, indeed, been sent to the intended recipient. This is particularly true when another person is assigned the task and must also perform other tasks or FAX other documents, thereby dividing that person's attention from the particular task that may require confirmation. It is, also, inherent in FAX machine feeders or during hand feeding a document of multiple pages that two or more pages are processed together one or more times resulting in an incomplete document received by the FAX receiver. No previous satisfactory method or device is available with the specific purpose of confirming that a particular document has been sent in its entirety. In addition no such device exists which operates without defacing the document which is undesirable in the case of legal documents.

U.S. Pat. No. 5,212,558, issued on May 18, 1993, to Obata, et al. describes a system which employs invisible ink to a receiving FAX machine document output to assure secure transmission only to the intended user who has a reader device operating under select light characteristics, enabling that user to read the information thereon. No provision is in the '558 patent is made for confirming the FAX has been completely sent from the sending machine.

U.S. Pat. No. 4,504,084, issued on Mar. 12, 1985, to Jauch describes an invisible marking system using a reading system which operates outside the visible spectrum. The '084 system is primarily designed for marking documents such as currency, securities, and identification cards. No mention is made of using this reading technique for the purpose of confirming that a FAX has been completely sent from a sending machine.

U.S. Pat. No. 5,837,042, issued on Nov. 17, 1998 to Lent et al. describes various formulations of invisible ink usable by an ink jet printer which are readable only upon exposure to ultra violet light. No mention is made of using this marking or reading technique for the purpose of confirming that a FAX has been completely sent from a sending machine.

None of the above inventions and patents, taken either singly or in combination, is seen to describe the instant invention as claimed.

SUMMARY OF THE INVENTION

The present invention provides a technique for readily marking documents as they are sent by a FAX machine to confirm the sending, the time, date, machine identification number, recipient's FAX telephone number or other desired information. This may be done by employing visible marking of the document or invisible marking without visibly defacing the document. This is useful to the sender to assure the complete message has been sent when desired, even if it is several pages in length, and may be useful in legally establishing that the document has been sent by FAX in a subsequent legal proceeding.

Accordingly, it is a principal object of the invention to provide a marking system which marks each page of a document as it is being sent by FAX with information as desired either visibly or invisibly without visibly defacing the document.

It is another object of the invention to provide a marking system which marks each page of a document being sent by FAX as above so the sender can confirm that each page of a document has been sent.

It is a further object of the invention to provide a marking system which marks each page of a document being sent by FAX as above with time sent, date, receiving telephone number, machine number, and any other desired information.

Still another object of the invention is to provide a marking system which marks each page of a document sent by FAX as above wherein the marking is of invisible ink which can be read only with a discreet source of light, but is invisible in the ordinary light spectrum.

Yet another object of the invention is to provide a marking system which marks each page of a document sent by FAX wherein such markings are useful for establishing dates and procedures used for purposes of legal confirmation that a document was, indeed, sent by FAX to the appropriate recipient.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention relates to FAX machines. More specifically, the invention is a method and apparatus for placing an indelible mark, on each page of a document which has been sent by FAX. This mark is placed on the face of each faxed document. The mark may be made with visible ink or, alternatively, with invisible ink(ink not normally visible to the naked eye).

Marking with invisible ink may be used when it is desired to apply markings without damage or ill effect to the original. The invisible markings are plainly revealed under proper lighting such as low voltage UV light. The sender's FAX machine applies a clear/transparent chemical or ink message on the surface of the document which contains information such as the FAX machine identification number, telephone number of the FAX recipient, and the time and date of the FAX transmission. The information is printed and is invisible to the naked eye, but becomes visible underneath a low voltage UV light. A low voltage UV light may be placed above the tray in which completed faxes are temporarily stored to make the mark visible to the operator to assure that each page of the document was separately sent, thereby determining that the document feeder of the machine has not sent multiple pages through the machine at once and thereby failing to send the complete document. A separate pen light may be used to allow a sender or management person to confirm that a document has been properly and completely transmitted. With the invisible mark, the document can be used as an original. The document can be re-transmitted to multiple recipients and a corresponding mark applied each time the document is faxed. This device is useful for all industries including law firms, banks, and governments, etc.

The usage of the inventive device insures increased accuracy in document transmission and document filing. Using the invisible mark technology in a FAX machine will eliminate mistakes such as faxing the document more than once to the same receiver and failing to fax the complete document The marking will help avoid disputes by serving as proof as to whether a particular document was faxed to a particular receiver at a certain time.

The invention may be used as a regular FAX machine and does not slow the transmission process or affect the received document.

Figure 1:
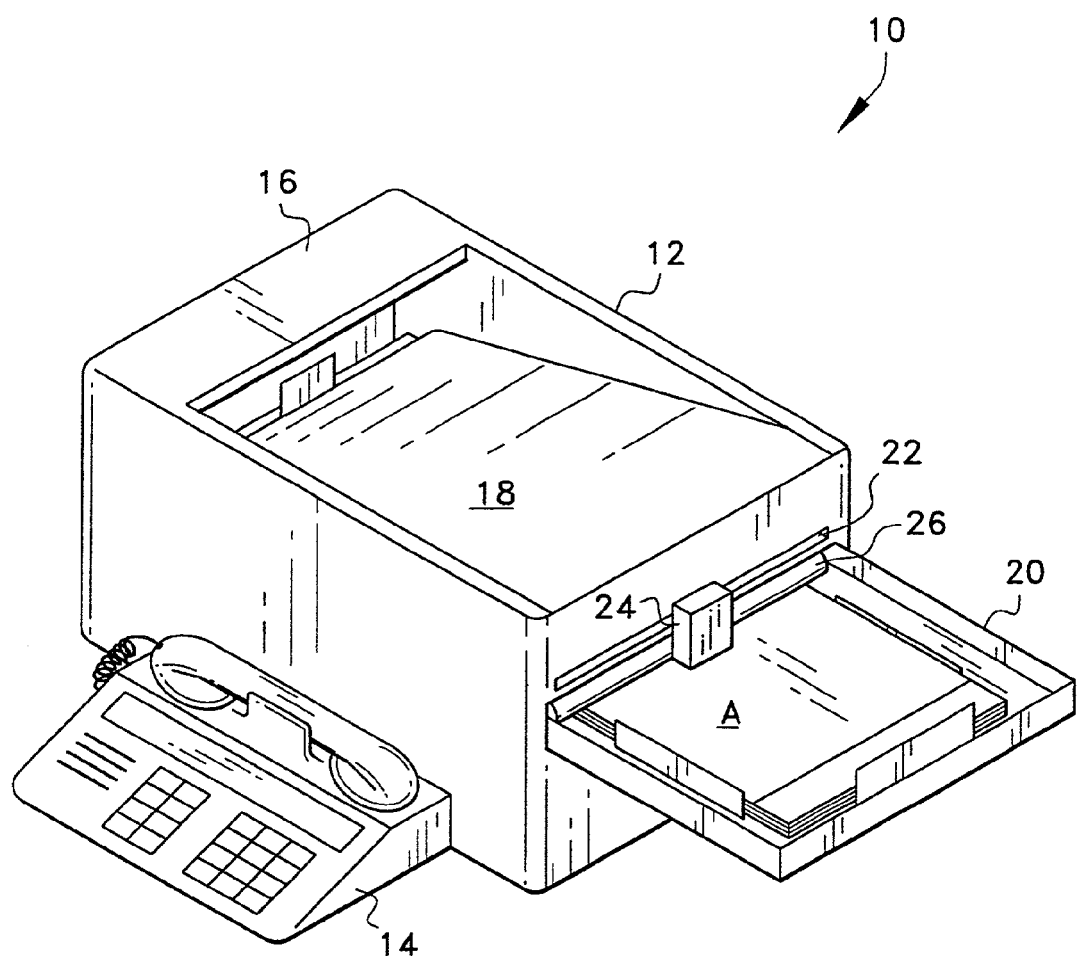
FIG. 1 is an environmental, perspective view of a fax confirmation device according to the present invention.

Referring to FIG. 1, there is illustrated a FAX confirmation device 10 having FAX machine 12 with telephonic device 14. FAX machine 12 has a casing 16, a FAX input tray 18 and a FAX output tray 20 for a document A being sent by FAX. The confirmation device of the present invention includes ink jet printer 22 having track or carriage mounted ink jet printer head 24 with printer feeding roller 26. The ink jet printer head 24 may contain visible ink such as black ink or invisible ink as desired. The printer head 24 is easily substitutable such that the desired ink is used. The confirmation printer 22 is shown external to casing 16, for illustration purposes, but may be located within casing 16.

Figure 2:
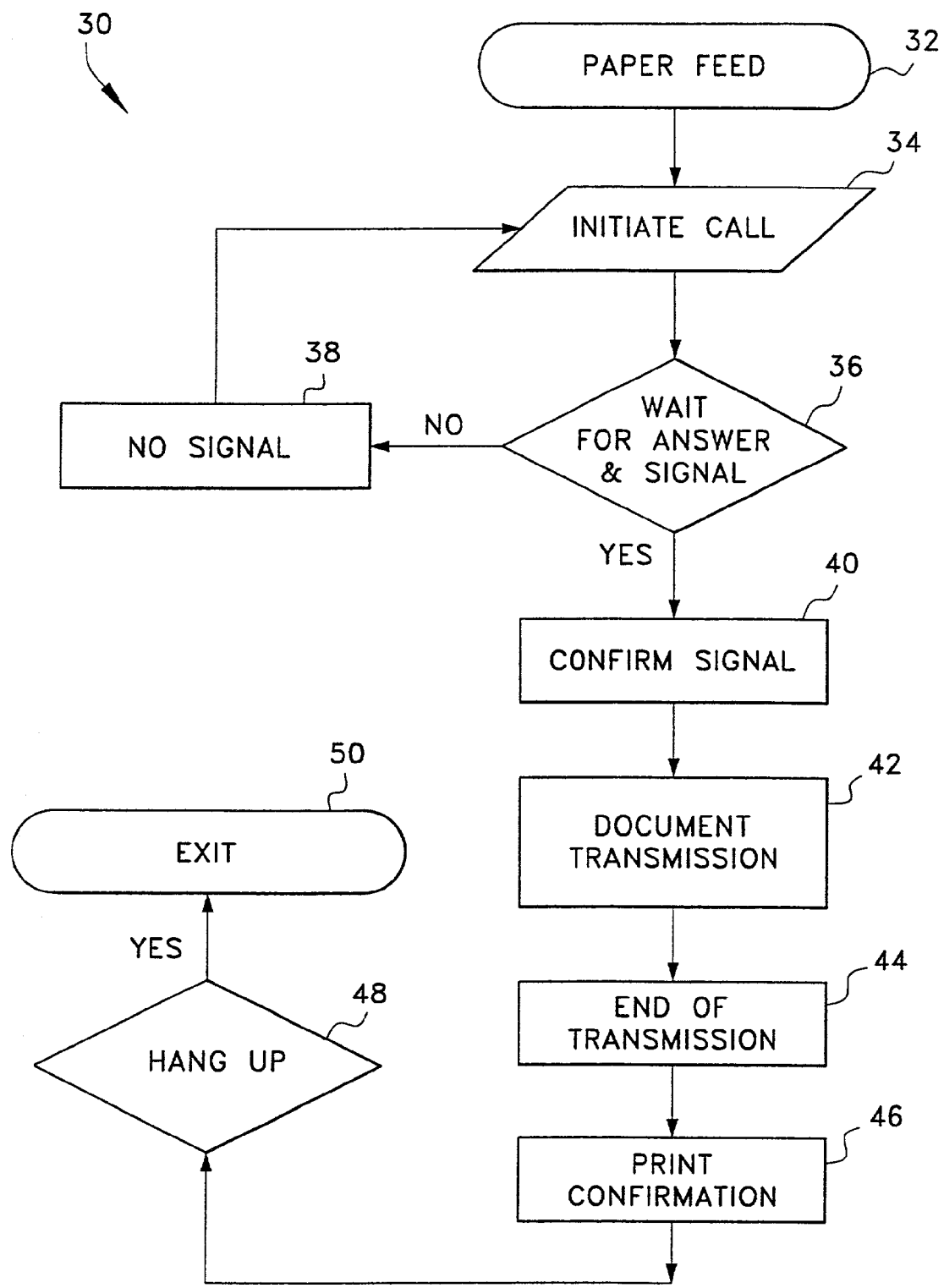
FIG. 2 is a flow diagram of a the method of using of the inventive device according to FIG. 1.

Referring to FIG. 2, there is presented a flow diagram 30 illustrating the operation of the inventive FAX confirmation device. Document A is subjected to paper feed step 32. A telephone call initiation step 34 is taken, followed by a wait period condition 36 to receive an answer and standard FAX signal. If no signal is detected, a no signal step 38 reactivates telephone call initiation step 34. If a signal is detected, a confirmation signal step 40 is initiated followed by a document transmission step 42. Upon the end of condition 44 being reached, the inventive print confirmation step 46 is taken, followed by telephone hang up 48 and exit from the FAX operation 50.

Figure 3:
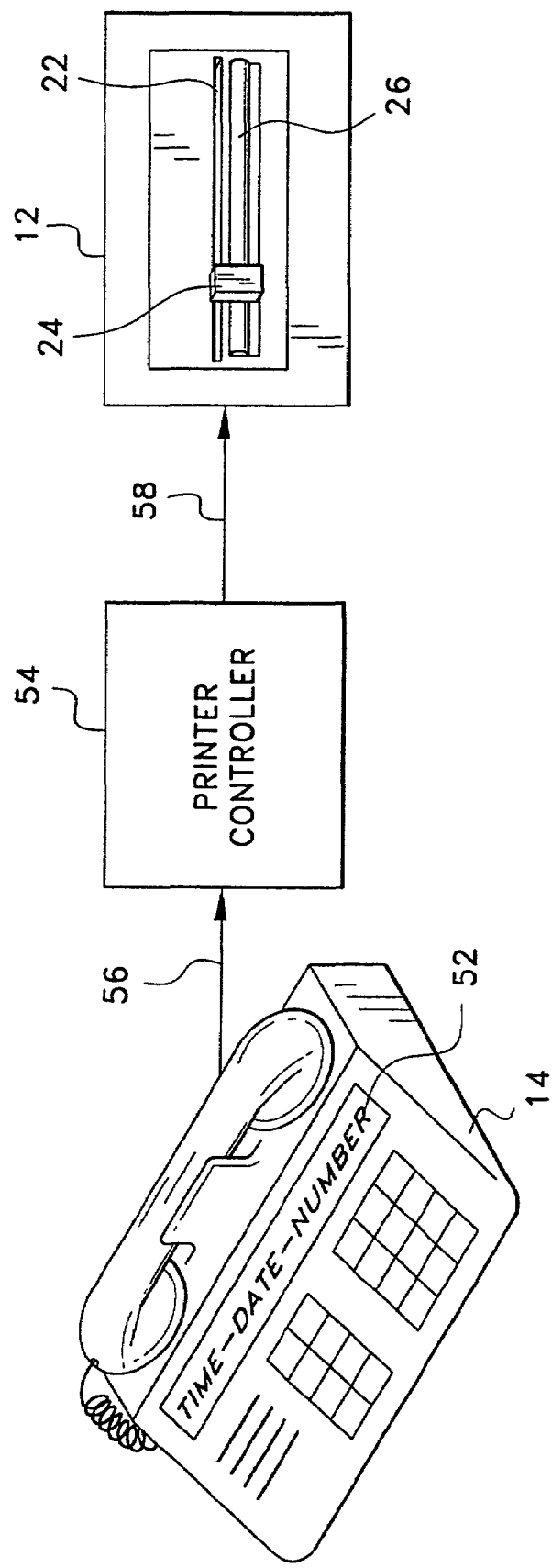
FIG. 3 is a diagrammatic view if the device of the present invention having the added capability to confirm each page is processed at the FAX machine.

Referring to FIG. 3, telephone set 14 is shown displaying information 52 such as the time, date and telephone number of the FAX. This type of device is commonly available on standard FAX machine displays, either on the telephone or elsewhere such as on the machine casing. In this embodiment, the time, date and number information is sent to a printer controller 54 by electrical signal conduit 56. The printer controller 54 then controls printer 22 in FAX machine 12, by electrical signal conduit 58. Printer 22 then controls printer head 24. Printer 22 prints desired information, including machine number, on the document A (see FIG. 1) in visible or invisible ink as desired. The details of construction of the printer controller 54 and printer 22 are well known in the art or obvious to the skilled artisan. To substantially reduce the chance of reprinting over a previous mark on a document that has been previously faxed, the printer controller 54 may be programmed to scroll the printer carriage down a line at a time for each page faxed until programmed to return to the top of the page.

Figure 4A:
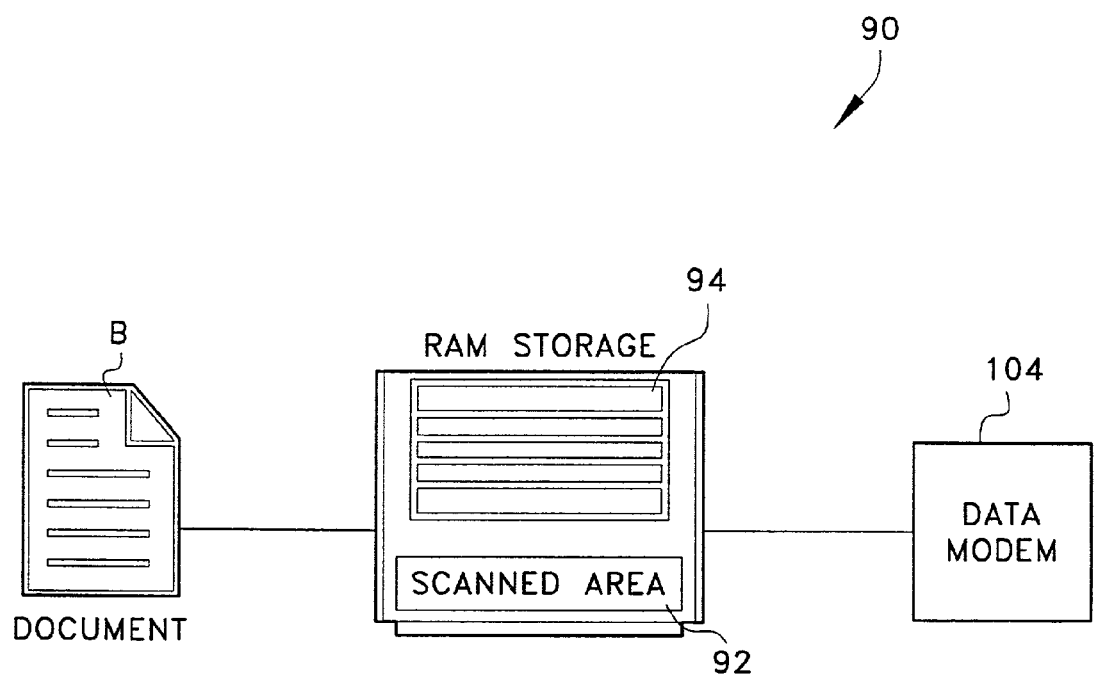
FIGS. 4A and 4B diagrammatically depict a complete FAX sending and receiving system for reference purposes.
Figure 4B:
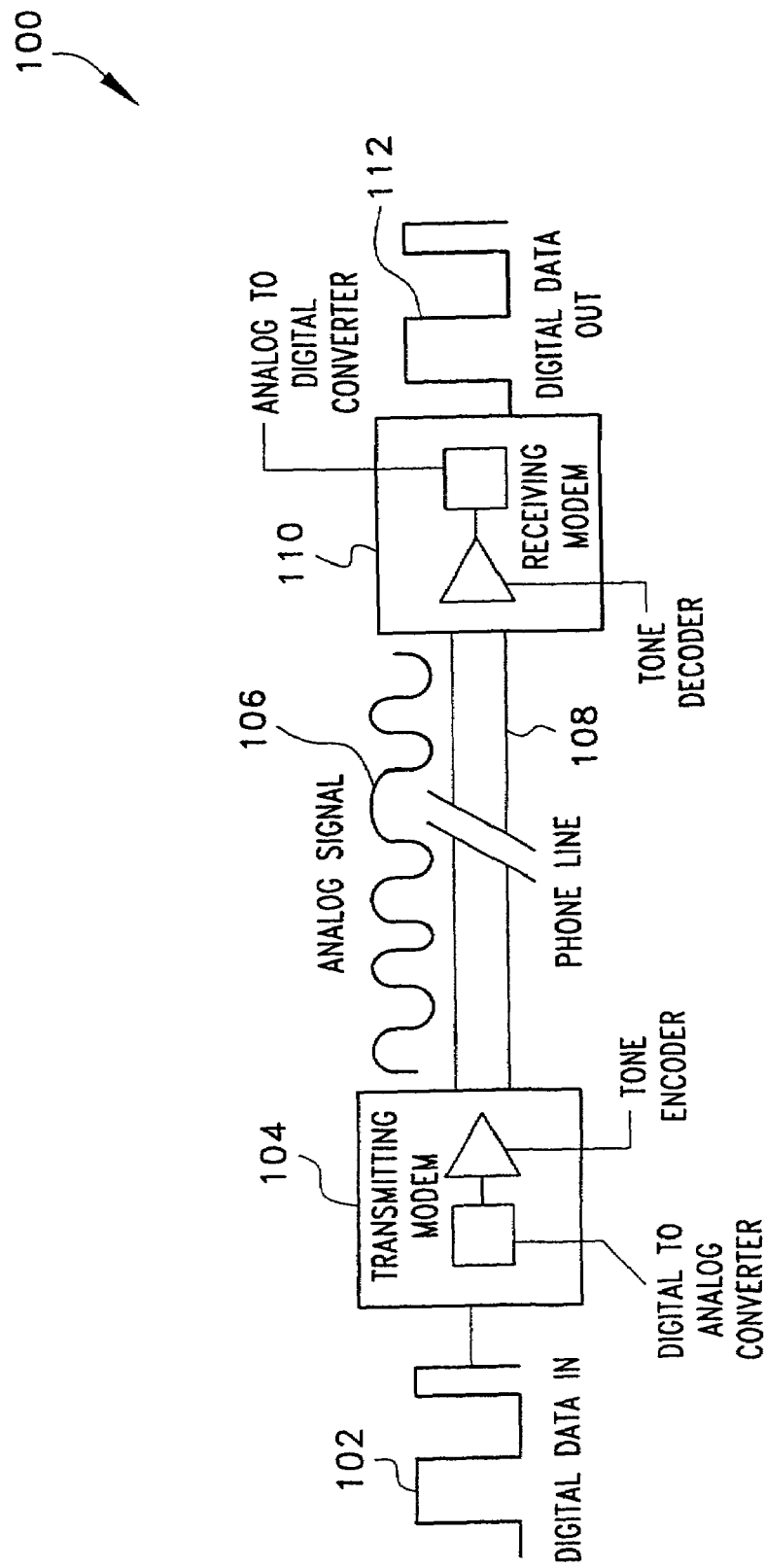

Referring to FIG. 4A, a diagrammatic view 90 is shown of a complete FAX sending and receiving system for reference purposes, wherein document B is scanned in scanning area 92 and the digital information is stored in RAM storage 94 and sent to data modem 104. Referring to FIG. 4B, digital data 102 from RAM storage is sent to transmitting modem 104 having a digital to analog converter and a tone encoder. Analog signals 106 are sent over telephone line 108, to receiving modem 110 having a tone decoder and an analog to digital converter. Digital data 112 is sent from receiving modem 110 to RAM storage for printout.

Figure 5A:
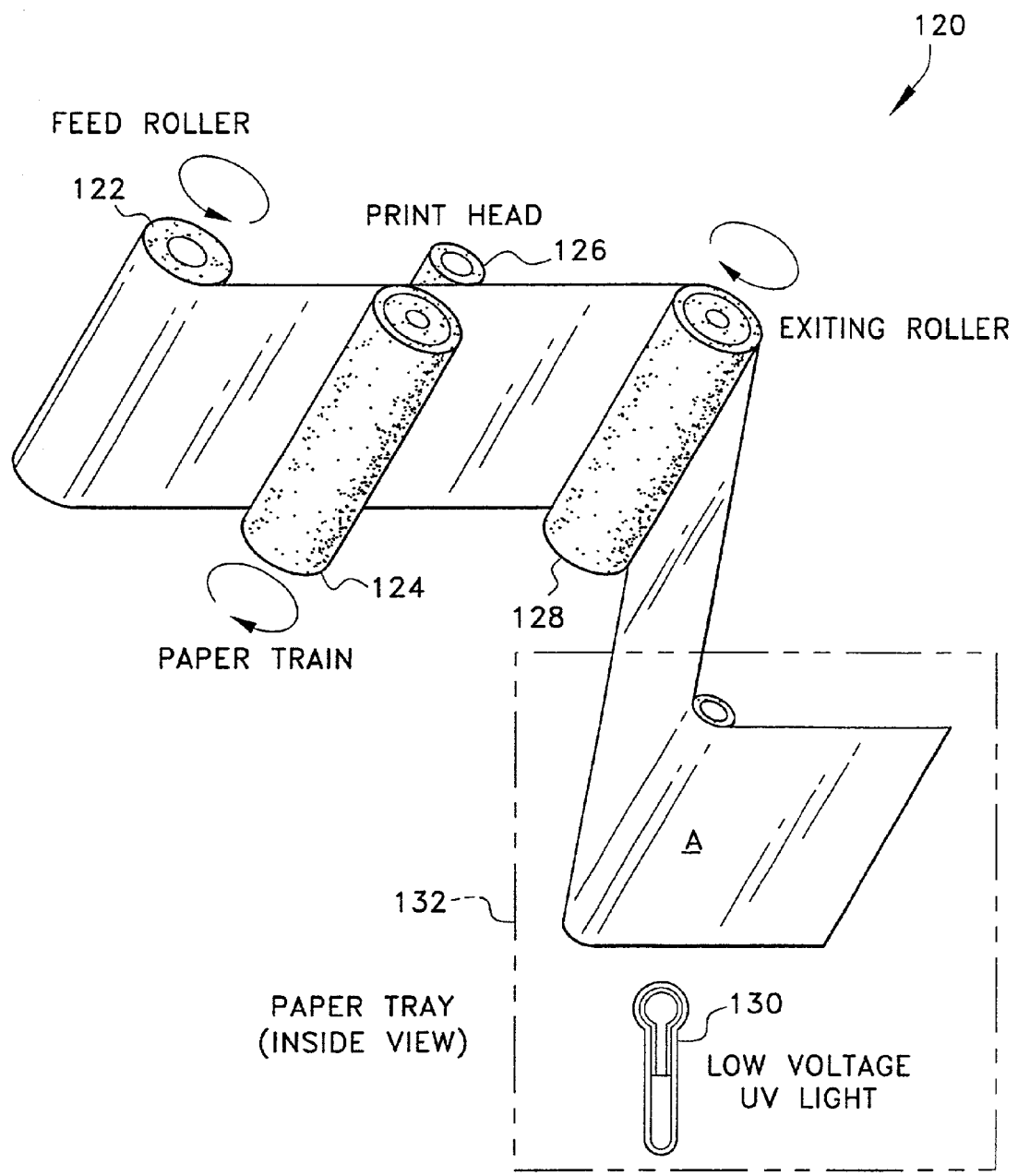
FIGS. 5A and 5B are a diagrammatic view of the inventive FAX confirmation apparatus of the present invention.

Referring to FIG. 5A, there is shown a diagrammatic view of another embodiment 120 of the inventive FAX confirmation apparatus of the present invention wherein the invisible confirmation message may be read at the paper outlet tray. Document A is fed from the scanning device by feed roller 122 to confirmation print head 126. In this embodiment the confirmation message is printed through a thermal process by print head 126. Document A, having an invisible confirmation message printed thereon is then carried to exiting roller 128 and finally to paper tray 132 where low voltage UV light 130 is conveniently placed, allowing the operator to read the confirmation message on the document A as it enters the tray 132. Visible ink may be used in this embodiment as desired.

Figure 5B:
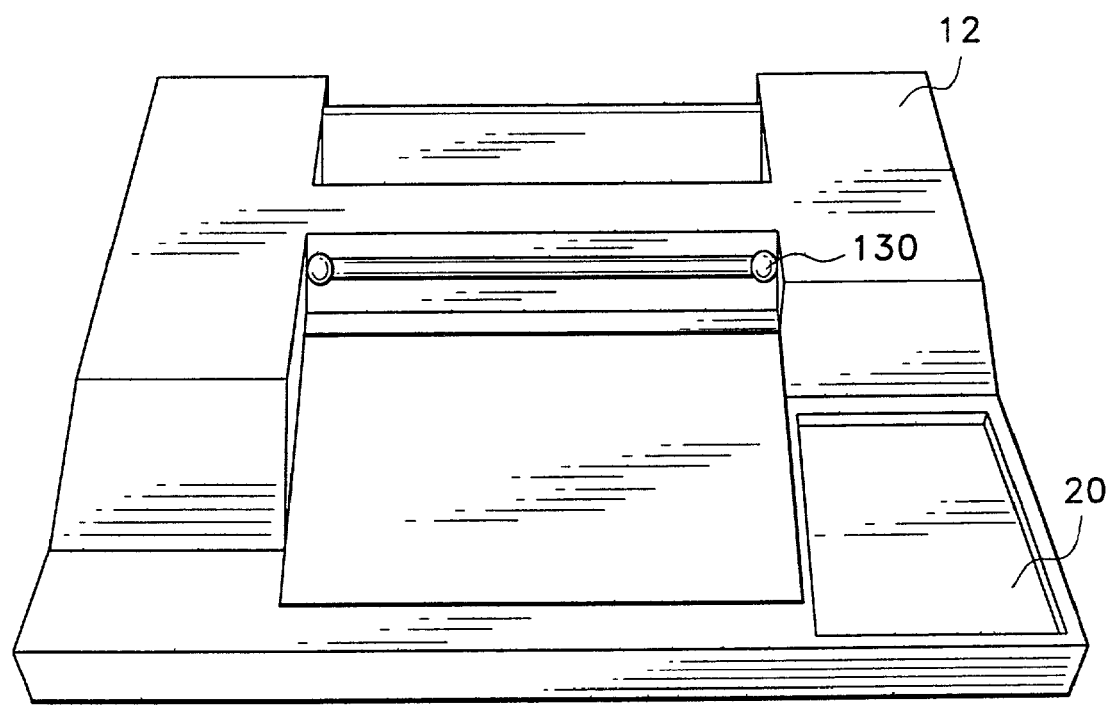

Referring to FIG. 5B, there is shown an exterior view of the embodiment of FIG. 5A wherein a low voltage UV lamp 130 is mounted on FAX machine 12 at a location above tray 20 (see FIG. 1).

Figure 6:
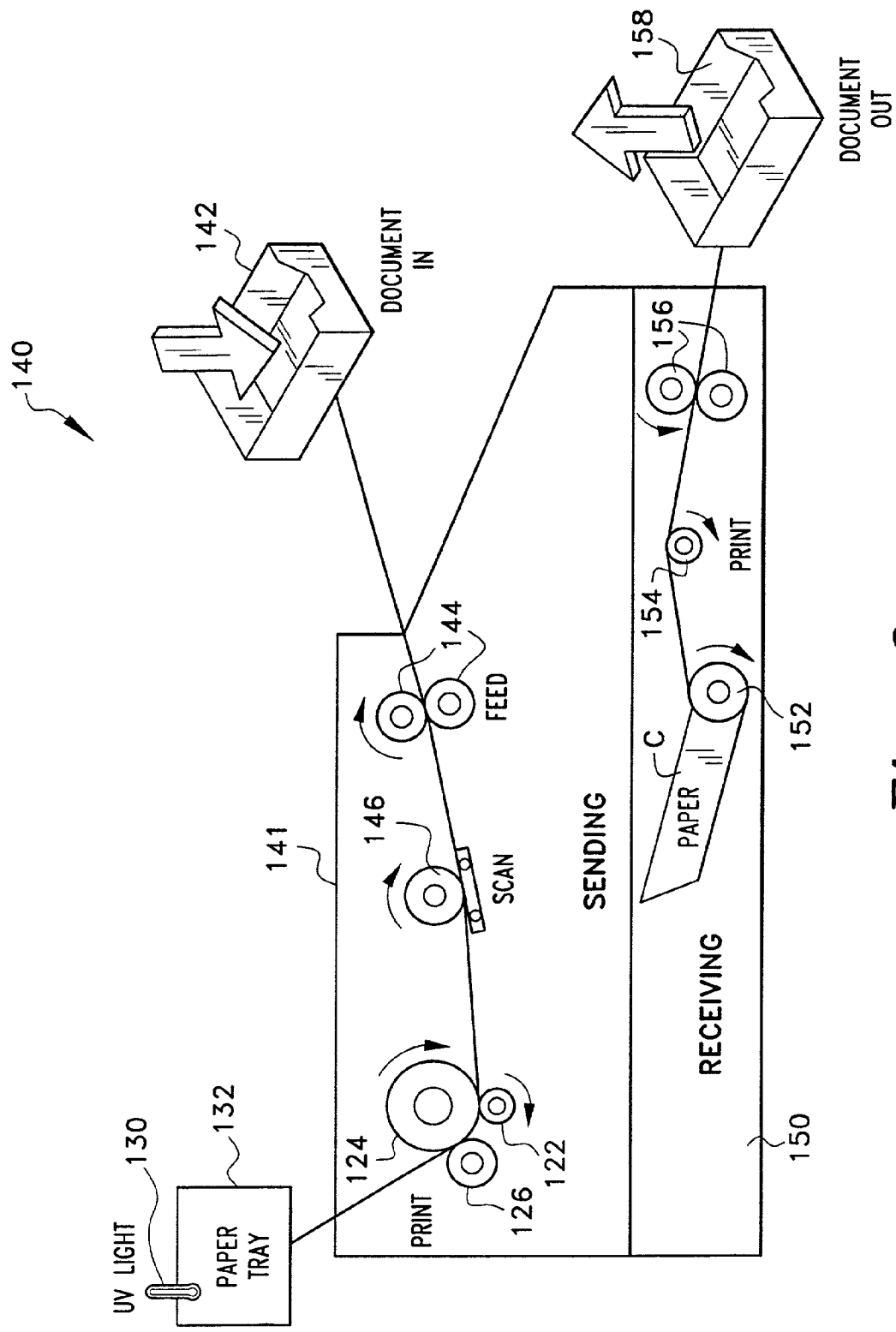
FIG. 6 is a diagrammatic view of the confirming FAX machine of FIG. 1 having a side wall broken away.

Referring to FIG. 6, there is shown a diagrammatic view 140 of the confirming FAX machine of FIG. 5A having a side wall broken away. Document A is placed in tray 142 where it is carried into the sending section 141 by feed rollers 144 to scanner 146 feed roller 122 and confirmation message printer head 126 opposite paper train roller 124, and lastly into paper tray 132 exposed to low voltage UV light 130. The receiving section 150 receives blank paper C which is fed by feed roller 152 to printer 154 where the received FAX information is printed. The document C is then sent by outlet feed rollers 156 to document paper tray 158. The printer head 126 is controlled by a printer controller (not shown) as in the system of FIG. 3. The printer controller may be programmed to sequentially skip printing lines as in the embodiment of FIGS. 1 and 3 to help avoid reprinting over a line on a document previously faxed.

In operation of the print confirmation device of FIG. 5A and FIG. 6, the paper feed in the print engine consists of a motor and rubber rollers 122. The motor (not shown) turns the rollers, which inches the paper through. Unlike the printing process of the FAX received document, the confirmation message is printed through a thermal process. Instead of the printer head directly heating sensitized paper, the printer head melts an ink ribbon, which in turn imparts color (invisible to the naked eye) to the paper. The document is fed into the print engine where a pressing roller 124, known as a paper train, presses the document A against a ribbon coated with visible or invisible ink as desired. After the paper passes through the paper train, the printer head 126 on the other side of the ribbon is turned on and melts small dots of the ink. The melted dots are pressed against the document. The paper train releases the document and it continues moving through until it is ejected. Once the document exits the print engine, a low voltage UV light 130 illuminates the printed image.

Invisible luminescent inks useful with the present invention include Beaver Luminescers® Beaver Working Ink Nos. 3 and 6, from Beaver Luminescers, Newton, Mass., USA.

It is to be understood that the present invention is not limited to the sole embodiments described above, but encompasses any and all embodiments within the scope of the following claims.

I claim:

1. A confirming facsimile (FAX) machine comprising:
   means for scanning and sending each page of a document electronically to a receiving FAX machine;
   means for marking each page of a document scanned and sent by said FAX machine with an ink message, the ink message being printed with an invisible ink which is only visible in the ultra violet (UV) spectrum; and
   means for reading said marking to confirm the scanning and sending of each page of said document, wherein said means for reading said marking is a low power UV pen light,
   wherein said FAX machine is configured to confirm that each page of a document has been scanned and sent by said FAX machine to a particular receiving FAX machine at a particular time and date.

2. The confirming FAX machine of claim 1, further comprising:
   a document output tray for receiving said each page of said document sent; and
   a low power UV light so mounted on said FAX machine as to illuminate said marking on each said page of said document as it enters said document tray.

3. The confirming FAX machine of claim 1, wherein said marking means is a printer for marking data including date, time the FAX is sent, and telephone number to which the FAX is sent.

4. The confirming FAX machine of claim 3, further comprising a printer controller for receiving electrical signals representing time, date, and FAX number from said FAX machine and controls said printer by sending corresponding electrical control signals to said printer.

5. The confirming FAX machine of claim 4, wherein said printer controller is programmed to scroll the carriage of said printer down a line at a time for each page faxed until programmed to return to the top of a page, whereby the chances of overwriting a confirmation marking made when previously FAXED is significantly reduced.

6. The confirming FAX machine of claim 5, wherein said printer is an ink jet printer.

7. The confirming FAX machine of claim 5, wherein said printer is a thermal process printer.

8. The confirming FAX machine of claim 7, wherein said thermal process printer comprises a print engine, having a pressing roller which presses the document against a ribbon coated with invisible ink, and a printer head on the opposite side of the ribbon and document which melts small dots of the ink which are pressed against the document to form said markings.

9. A facsimile (FAX) confirmation device comprising:
   means for marking each page of a document scanned and sent by a FAX machine with an ink message, the ink message being printed with an invisible ink which is only visible in the ultra violet (UV) spectrum;
   a document output tray for receiving said each page of said document sent, and a low power UV light so mounted on said FAX confirmation device as to illuminate said marking on each said page of said document as it enters said document tray; and
   means for reading said marking to confirm the scanning and sending of each page of the document to a particular receiving FAX machine at a particular time and date,
   wherein said FAX confirmation device is configured to be attached with a FAX machine at a point past the output of a scanner of said FAX machine.

10. The FAX confirmation device of claim 9, wherein said means for reading said marking is a low power UV pen light.

11. The FAX confirmation device of claim 9, wherein said marking means is a printer for marking data including date, time each page of the document is sent, and telephone number to which each page of the document is sent.

12. The FAX confirmation device of claim 11, further comprising a printer controller for receiving electrical signals representing time, date, and FAX number from the FAX machine and controlling said printer by sending corresponding electrical control signals to said printer.

* * * * *